US005835907A

United States Patent [19]

Newman

[11] Patent Number: 5,835,907

[45] Date of Patent: *Nov. 10, 1998

[54] EMERGENCY PCS SYSTEM FOR IDENTIFICATION AND NOTIFICATION OF A SUBSCRIBER'S LOCATION

[75] Inventor: Brian Newman, Colorado Springs, Colo.

[73] Assignee: MCI Communications Corporation, Washington, D.C.

[ * ] Notice: This patent issued on a continued prosecution application filed under 37 CFR 1.53(d), and is subject to the twenty year patent term provisions of 35 U.S.C. 154(a)(2).

[21] Appl. No.: 575,196

[22] Filed: Dec. 20, 1995

[51] Int. Cl.[6] .......... G06F 17/30

[52] U.S. Cl. .......... 707/10; 340/825.49; 340/825.45; 455/440; 455/456; 379/37

[58] Field of Search .......... 379/58, 37; 340/436, 340/988, 995, 825.06, 825.44, 825.47, 825.45, 825.49, 825.36; 342/457; 370/94.1; 455/66, 404, 440, 456; 364/449.7, 449.9

[56] References Cited

U.S. PATENT DOCUMENTS

| | | | |
|---|---|---|---|
| 4,347,501 | 8/1982 | Akerberg | 340/539 |
| 4,593,273 | 6/1986 | Narcisse | 340/539 |
| 4,675,656 | 6/1987 | Narcisse | 340/539 |
| 5,029,199 | 7/1991 | Jones et al. | 379/88.26 |
| 5,045,861 | 9/1991 | Duffett-Smith | 342/457 |
| 5,073,784 | 12/1991 | Westfall | 342/465 |
| 5,170,487 | 12/1992 | Peek | 455/45 |
| 5,173,710 | 12/1992 | Kelley et al. | 342/463 |
| 5,193,215 | 3/1993 | Olmer | 455/66 |
| 5,195,090 | 3/1993 | Bolliger et al. | 370/94.1 |
| 5,196,825 | 3/1993 | Young | 340/539 |
| 5,235,633 | 8/1993 | Denisson et al. | 379/88.26 |
| 5,351,194 | 9/1994 | Ross et al. | 364/449 |
| 5,388,147 | 2/1995 | Grimes | 379/59 |
| 5,485,161 | 1/1996 | Vaughn | 342/357 |
| 5,485,163 | 1/1996 | Singer et al. | 342/457 |
| 5,543,789 | 8/1996 | Behr et al. | 340/995 |
| 5,552,772 | 9/1996 | Janky et al. | 340/573 |
| 5,568,153 | 10/1996 | Beliveau | 342/347 |
| 5,572,204 | 11/1996 | Timm et al. | 340/988 |
| 5,574,427 | 11/1996 | Cavallaro | 340/436 |
| 5,576,689 | 11/1996 | Queen | 340/514 |
| 5,583,914 | 12/1996 | Chang et al. | 379/58 |
| 5,594,425 | 1/1997 | Ladner et al. | 340/825.06 |
| 5,594,650 | 1/1997 | Shah et al. | 364/449.1 |
| 5,596,500 | 1/1997 | Sprague et al. | 364/449.7 |
| 5,608,410 | 3/1997 | Stilp et al. | 342/387 |
| 5,625,668 | 4/1997 | Lommis et al. | 379/58 |
| 5,689,245 | 11/1997 | Noreen et al. | 340/825.49 |

*Primary Examiner*—Paul R. Lintz
*Assistant Examiner*—Frantz Coby

[57] ABSTRACT

A wireless communication device, operating over frequencies allocated to Personal Communications Services (PCS), uses Global Positioning System (GPS) technology to determine the subscriber's exact location on a periodic basis. The device sends the location information to a database for storage and subsequent retrieval by a Geographical Information System (GIS) software application. The GIS converts the location information represented by a latitude/longitude combination to a user-friendly classification of a block, street, city, etc. The user-friendly classification of the subscriber's location is then automatically communicated to emergency services and/or a designated contact, if an emergency button has been activated on the device. Alternatively, the device responds to on-demand inquiries on the subscriber's location via a computer link or a computerized voice processing equipment, such as a Voice Response Unit (VRU).

15 Claims, 3 Drawing Sheets

| | 300 Before Activation | 302 After Activation | 304 Periodic Update | 306 Emergency Activation |
|---|---|---|---|---|
| **Time** | 00:05 | 00:05 | 00:10 | 00:13 |
| **WEPD ID** | 123456 | 123456 | 123456 | 123456 |
| **GPS Coordinates** | none | 90° W Latitude,<br>30° N Longitude,<br>20'<br>33" | 90° W Latitude,<br>30° N Longitude,<br>20'<br>40" | 90° W Latitude,<br>30° N Longitude,<br>30'<br>60" |
| **GIS Map Location** | none | 111 Elm Street,<br>New Orleans,<br>Louisiana, USA | 130 Elm Street,<br>New Orleans,<br>Louisiana, USA | 220 Oak Street,<br>New Orleans,<br>Louisiana, USA |
| **Stored Location** | none | 111 Elm Street,<br>New Orleans,<br>Louisiana, USA | 130 Elm Street,<br>New Orleans,<br>Louisiana, USA | 220 Oak Street,<br>New Orleans,<br>Louisiana, USA |
| **Emergency Indicator** | none | OFF | OFF | OFF |

FIG. 3

EMERGENCY PCS SYSTEM FOR IDENTIFICATION AND NOTIFICATION OF A SUBSCRIBER'S LOCATION

FIELD OF THE INVENTION

This invention relates to wireless communication systems and, in particular, a personal communications services (PCS) device for identifying the subscriber's location and sending the location information over wireless medium to an emergency service, such as police, or any other party at its request.

BACKGROUND OF THE INVENTION

Safety concerns constitute one of the reasons for increasing the demand for wireless communication devices. For example, cellular telephone subscribers want to quickly call for help in the event of a car failure, accident, crime, etc. regardless of where they are located. Similarly, parents, friends or relatives would like to determine the location of their loved ones to alleviate their concerns over safety and/or possibly notify the emergency services. While a cellular telephone can facilitate voice communication in these situations, it cannot be used to accurately pinpoint the subscriber's location. This is due to the cellular system technology which is based on dividing an area into cells where each cell may cover anywhere from 3 to 6 or more miles in each direction.

Because cells can cover several square miles in a metropolitan area and much more in a suburban or rural area, it is very difficult to narrow down the location of a cellular telephone to a particular street of the city or a part of the region. This has been demonstrated by several events involving accidents of small planes and cars in remote areas. Survivors of these accidents used cellular telephones to call for help, but were unable to provide their exact location. Cellular telephone carriers assisted in the search for accident victims by bringing in technicians, identifying the cell and direction of the call, and then dispatching receiving equipment to that area to further determine the location of the accident. While help and rescue were activated, significant delays occurred due to inability to quickly and precisely determine the originating location of the accident victim's call.

Even though general safety concerns have become a big factor in the wireless industry and increased the sale of cellular telephone service and equipment, cellular carriers fail to offer an inexpensive emergency locator service. Currently, customers pay an average of $30 per month simply to have a cellular telephone in case of an accident, car breakdown, or robbery. Unfortunately, when emergencies are encountered, the subscriber has to communicate his or her location under stressful conditions. According to one study conducted in Los Angeles, 25 percent of cellular 911 callers could not tell the dispatcher their location because they were confused, under stress, hurt, etc. Further complicating the situation is the fact that a cellular caller is mobile, and it is therefore meaningless to forward the caller's telephone number to an emergency services dispatch center, unlike for a landline caller in distress.

To achieve widespread use, a wireless safety device must possess two things: nominal cost and accurate means for a location identification. In order to successfully enter this market, equipment manufacturers and service providers must design a very cost-sensitive, no-frills device without any significant modifications to the existing infrastructure of wireless technology. Currently, the proposed devices, as represented for example by U.S. Pat. No. 5,388,147 to Grimes, use cellular technology to include voice communication along with the location identification feature. This bundling of different features in a single unit produces a "souped-up" cellular telephone which vastly increases the cost and at the same time decreases the potential pool of subscribers by lowering the telephone's affordability. Using this combination unit, the manufacturers and service providers are virtually prevented from offering a low-cost, wireless locator device and a service associated with it, which would be highly affordable to a vast majority of population.

A need, therefore, exists for a simple, inexpensive wireless device for identifying the subscriber's location quickly and accurately, and sending the location information to the emergency services, such as police for example, or any other party in response to the request for the call origination location without any additional involvement by the subscriber.

SUMMARY OF THE INVENTION

In accordance with one embodiment of the present invention, an emergency personal communications services (PCS) system provides information on a subscriber's location. The system comprises an emergency PCS device for receiving signal transmissions from several GPS satellites, converting the received signals into information identifying a location of the emergency PCS device, and transmitting the location information and a code for the emergency PCS device to a computer network over a wireless medium.

Further in accordance with this embodiment of the present invention, a database located on the computer network stores the location information and the code. In response to the storage of information in the database, an application program running on the computer network converts the stored location information into generally understood location information, such as a block, street, city, country. The converted location information is stored in the database in correspondence with the code for the emergency PCS device.

Further according to this embodiment of the present invention, after the conversion and storage, emergency services and/or a designated contact are automatically notified if an emergency distress signal has been activated by the subscriber. Alternatively, if the emergency distress signal has not been activated, a voice processing system provides on-demand information on the subscriber's location to a telephone caller who supplies the emergency PCS device's code. The voice processing system interfaces with the telephone caller, as well as the database via the computer network.

In accordance with this embodiment of the present invention, the reception of signal transmission from the GPS satellites and the transmission of location information to the computer network may either occur periodically on a predetermined subscriber basis or immediately upon activation of the emergency distress signal.

In accordance with another embodiment of the present invention, the voice processing system may comprise a voice response unit (VRU) which includes a menu selection for obtaining the subscriber's location information.

According to yet another embodiment of the present invention, a second database may be used for storing the generally understood location information after the conversion by the application program.

BRIEF DESCRIPTION OF THE DRAWINGS

The above-mentioned as well as additional advantages and features of the present invention will be evident and more clearly understood when considered in conjunction with the accompanying drawings, in which:

FIG. 3 shows a representative data table containing a temporal sequence of events before and after activation of the emergency PCS device in accordance with one embodiment of the present invention.

DESCRIPTION OF THE PREFERRED EMBODIMENTS

Figure 1:
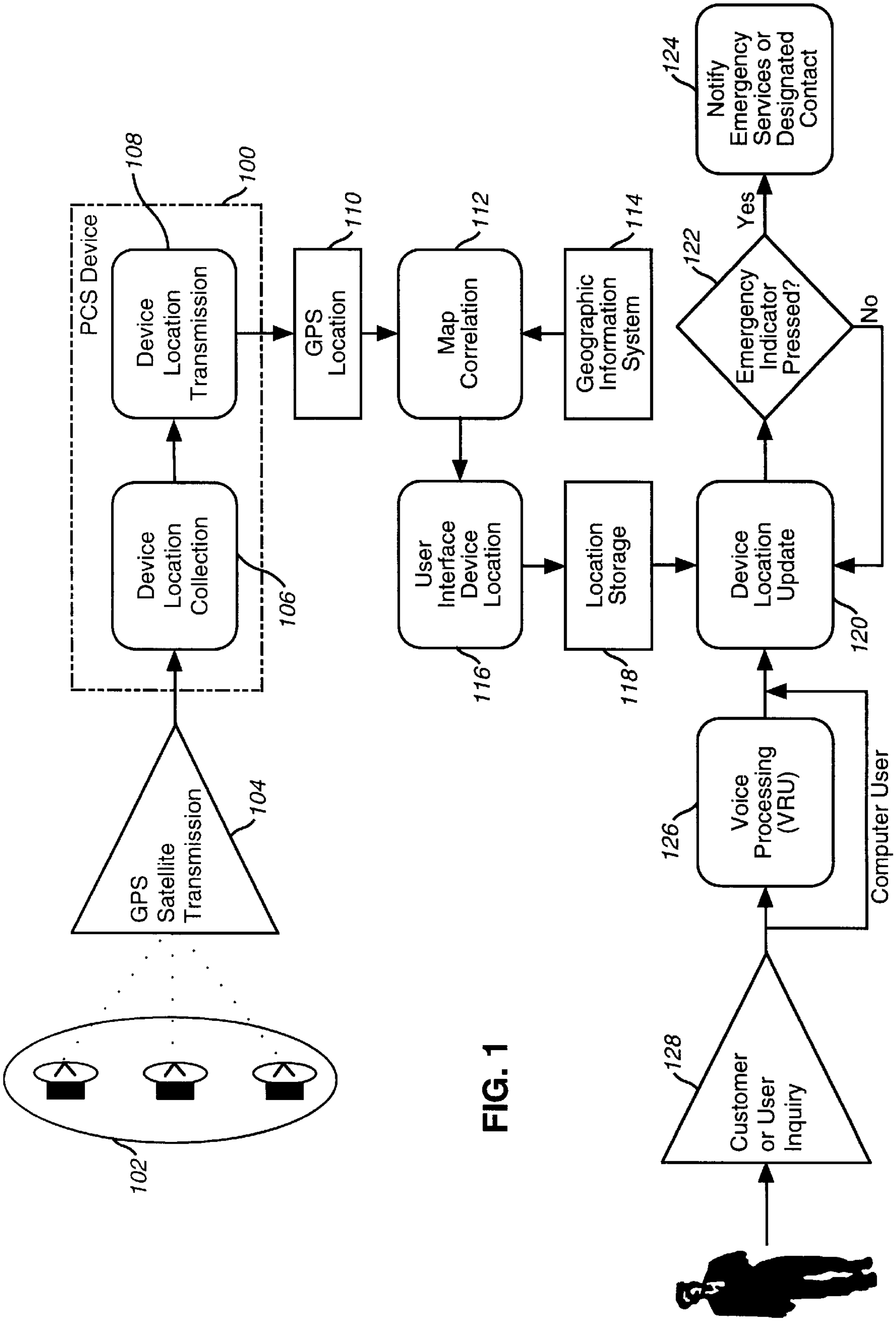
FIG. 1 shows a sequence flow diagram of the emergency PCS system for identification and notification of the subscriber's location in accordance with one embodiment of the present invention.

As a general overview, the present invention includes a wireless emergency PCS system which enables a subscriber to convey his or her location with pinpoint accuracy using the Global Positioning System (GPS) satellites. The disclosed device interfaces with a computer network using PCS data communications technology, sending a location information either on demand to a concerned inquirer via a voice processing unit or automatically to emergency services, such as police, medical ambulance, etc. and/or a designated contact. The term subscriber, as used herein, includes any legitimate user, not necessarily the owner, of the disclosed device.

Due to its compact size resembling a paging device, the emergency PCS device can be easily carried or worn on a person to enable the tracking of children, automobiles or other mobile equipment, pets, etc. As long as the disclosed device is turned on, it periodically receives coordinates from the GPS satellites and sends its location information to the computer via the PCS network. Furthermore, the frequency of transmissions containing the location information is adjustable and may be set according to the subscriber's needs, with the updates ranging from 5 minutes to 1 hour, for example. If the situation requires immediate attention, however, the next scheduled transmission of the location information can be overridden by pressing an emergency distress button, which is located on the device, generating a distress signal. This would force an immediate request for location information from GPS and transmission of the received coordinates to the PCS network for subsequent processing by the computer.

The emergency PCS device utilizes both the global positioning satellite system and wireless communications networks to transmit the location of the device. When the device is turned on, it obtains its location from at least 3 of 21 satellites orbiting the earth, provided that either a pre-set time period has elapsed or the distress signal has been generated by pressing a button. As known in the art, the GPS satellites are part of the Global Positioning System technology originally developed by the U.S. Department of Defense for governmental use only, but now available commercially.

Based on the number of satellites in the "line of sight" of the subscriber's location, the emergency PCS device can determine its position with the accuracy of approximately 10 meters. It is understood, of course, that the accuracy of location identification is based on the number of GPS satellites in the "line of sight" for the device at a given moment, radio frequency (RF) signal propagation of each GPS satellite, the location of the emergency PCS device on earth, as well as other factors.

Once, the subscriber has determined his or her global coordinates using GPS, the emergency PCS device accesses the PCS network through an assigned telephone number. After establishing the connection using an interface standard of Code Division Multiple Access (CDMA), Time Division Multiple Access (TDMA) or any other modulation technique, the emergency PCS device sends its location information in data packets at high speed over the wireless medium.

The received location information is stored in a database of a computer network and subsequently modified by a Geographical Information System (GIS) software application. The GIS converts the typical latitude/longitude coordinates supplied by the GPS satellites into a location readily comprehensible by a lay person. Thus, while the GPS-provided global coordinates may be expressed in terms of latitude and longitude as an angular measurement of 30°, 36', 15" north, and 90°, 5', 6" east, this position may be translated, for example, to indicate 123 Poplar Avenue, New Orleans, La., USA. This information can then be useful to those persons having direct computer links to the database or a voice response system access, or seeking emergency services such as police, fire, or ambulance crews.

The present invention is more specifically disclosed in accordance with FIG. 1 which shows a sequence flow diagram of the emergency PCS system for identification and notification of the subscriber's location. There are 21 orbiting satellites, as representatively shown by a reference numeral 102, which transmit signals containing various information such as position, time, etc. The signals transmitted by the GPS satellites and received by the emergency PCS device 100 are designated as GPS Satellite Transmission 104 in FIG. 1. GPS Satellite Transmission 104 occurs continuously except for short periods of time when the system is tested or calibrated by the U.S. Department of Defense. GPS Satellite Transmission 104 includes the transmission of GPS signals to the emergency PCS device 100 at 1575.42 MHz and 1227.60 Mhz. To identify the subscriber's location, the signals must be received from at least three satellites as shown in FIG. 1, while the reception of five satellite transmission signals will achieve a better accuracy in locating the position of the emergency PCS device 100.

Device Location Collection 106 includes an RF reception of GPS Satellite Transmission 104 by a receiver and determination of the latitude and longitude based on the received satellite signals as known in the art. This activity should take no more than 15 seconds to complete, occurring periodically in accordance with the subscriber setting.

After receiving GPS Satellite Transmission 104 and determining the angular coordinates in terms of latitude and longitude, the emergency PCS device 100 must transmit those coordinates, as well as an emergency distress signal if applicable, to a database for storage and processing. Using Device Location Transmission 108, the emergency PCS device 100 accesses a PCS network over the wireless medium and, using its unique identification number or a code, proceeds to log onto a computer. The computer, which may be located on a computer network as known in the art, then sends the coordinates, and the emergency indicator if applicable, to an information resource, designated as GPS Location 110, which is a database being accessed by the computer. The information resource 110 may be either collocated or remotely located with the computer. The processing by Device Location Transmission 108 should occur in no more than 30 seconds including the update of the information resource 110 with the coordinates of the emergency PCS device 100.

Following the accessing of the PCS communications network via Device Location Transmission 108, the logging onto the computer via an identification which uniquely identifies each emergency PCS device and the transferring of the pertinent information about the specific emergency PCS device 100, this information is stored in the information resource 110. Map Correlation 112 utilizes the stored location information to transform the latitude and longitude to the more user-friendly designation of the geographic area. Because GPS Satellite Transmission 104 provides significant location detail, this mapping must be sophisticated. The coordinates must be related to common geographic terminology to serve the needs of anyone wanting to know the location of the device in a city or area.

Map Correlation 112 has the following objectives: access the stored location information in the information resource 110 and correlate the coordinates with the geographic area. The correlation is performed using another information resource, which is Geographic Information System (GIS) 114, in order to determine the location of the emergency PCS device 100 in terms of the commonly understood geographic information. Geographic Information System 114 is a reference database containing entries for block, street, city, etc. Map Correlation 112 occurs between the information resource 110 and Geographic Information System 114 as soon as the information resource 110 is updated with the latitude/longitude information by Device Location Transmission 108.

After the coordinates from GPS have been mapped to the corresponding geographic area, User Interface Device Location 116 processing is invoked. User Interface Device Location 116 receives the GIS-determined, user-friendly location information, and the emergency distress signal if applicable, and stores them to yet another information resource such as Location Storage 118 which may be a database, for example. This information is stored in the database to enable an access by emergency services personnel or an interested party. The activity performed by User Interface Device Location 116 occurs immediately after Map Correlation 112 has taken place and is completed within 2 seconds.

Next, Device Location Update 120 provides a direct interface for supplying the information on the location of the emergency PCS device 100. Thus, Device Location Update 120 obtains the location of the emergency PCS device 100 from the information resource Location Storage 118 and the emergency distress signal if applicable, and formats the location information for access by the inquirer.

If information resource Location Storage 118 contains the emergency distress signal, Device Location Update 120 forwards this signal, i.e., emergency indicator, in response to decision 122. Emergency services and/or a designated contact, as initially selected by the subscriber at the time of purchase or leasing the emergency PCS device 100, are notified via Notify Emergency Services or Designated Contact 124 for subsequent action. Based on the subscriber's selection, activation of the emergency distress button generates a signal for notifying emergency services, a designated contact, or both. This function provides a level of safety and reassurance to the subscriber and more specifically includes dialing or accessing the emergency services computer network automatically; relaying the location information of the emergency PCS device 100; if selected, dialing an emergency contact telephone number automatically; and relaying the location information of the emergency PCS device 100. If the emergency distress button has not been pressed on the emergency PCS device 100, no emergency distress signal is generated. No action is therefore taken concerning the emergency services and/or a designated contact.

In addition to the above automatic notification in response to activating the distress signal, Device Location Update 120 serves as an interface for handling optional on-demand inquiries, where the location information represented by a common map-usage language is provided upon request from an inquirer. Customer or User Inquiry 128 occurs when an inquirer desires information about the device's location, provided he or she knows the ID of the emergency PCS device 100. Access may be through a personal computer, for example, linked to a database via a network. Some knowledge and familiarity with the computer principles is required in this case.

Alternatively, a voice response system 126 presents a more user-friendly method of accessing the location information in information resource Location Storage 118. As shown in FIG. 1, the voice response system which may include a Voice Response unit (VRU), an Audio Response Unit (ARU), or an Interactive Voice Response (IVR) are utilized to gain access via a telephone call. According to this embodiment, an inquirer calls a designated telephone number to request information on the location of the emergency PCS device 100. The VRU answers the telephone call and queries the caller for an ID or code number assigned to the emergency PCS device 100. Upon acceptance of the ID or code number, the VRU responds with the information in English, Spanish, or another language on the location of the emergency PCS device 100 using widely accepted and understood location terms, i.e., a block, street, city, country.

For example, an inquirer can call 1-800-555-WEPD, and the following sequence of events will take place:

1) VRU answers the call: "Hello this is Magic Locator System. Please enter code number."
2) Inquirer: "1234567"
3) VRU: "Thank you. Device 1234567 is presently at 111 Elm Street, Chicago, Ill., USA. Last update at 1:30 pm EDT, Nov. 11, 1995. Please press 1 for another code number or press 2 to terminate this session."
4) Inquirer: "2"
5) VRU: "Thank you for using Magic Locator System."

It is understood, of course, that the above sequence of events is merely representative of the voice processing system in accordance with one embodiment of the present invention. A more extensive voice menu with various options may be developed and implemented based on the service provider's needs and requirements.

On-demand inquiries should have no limitations except for topography or natural/man-made objects that affect RF transmission of signals at frequencies allocated to PCS.

Figure 2:
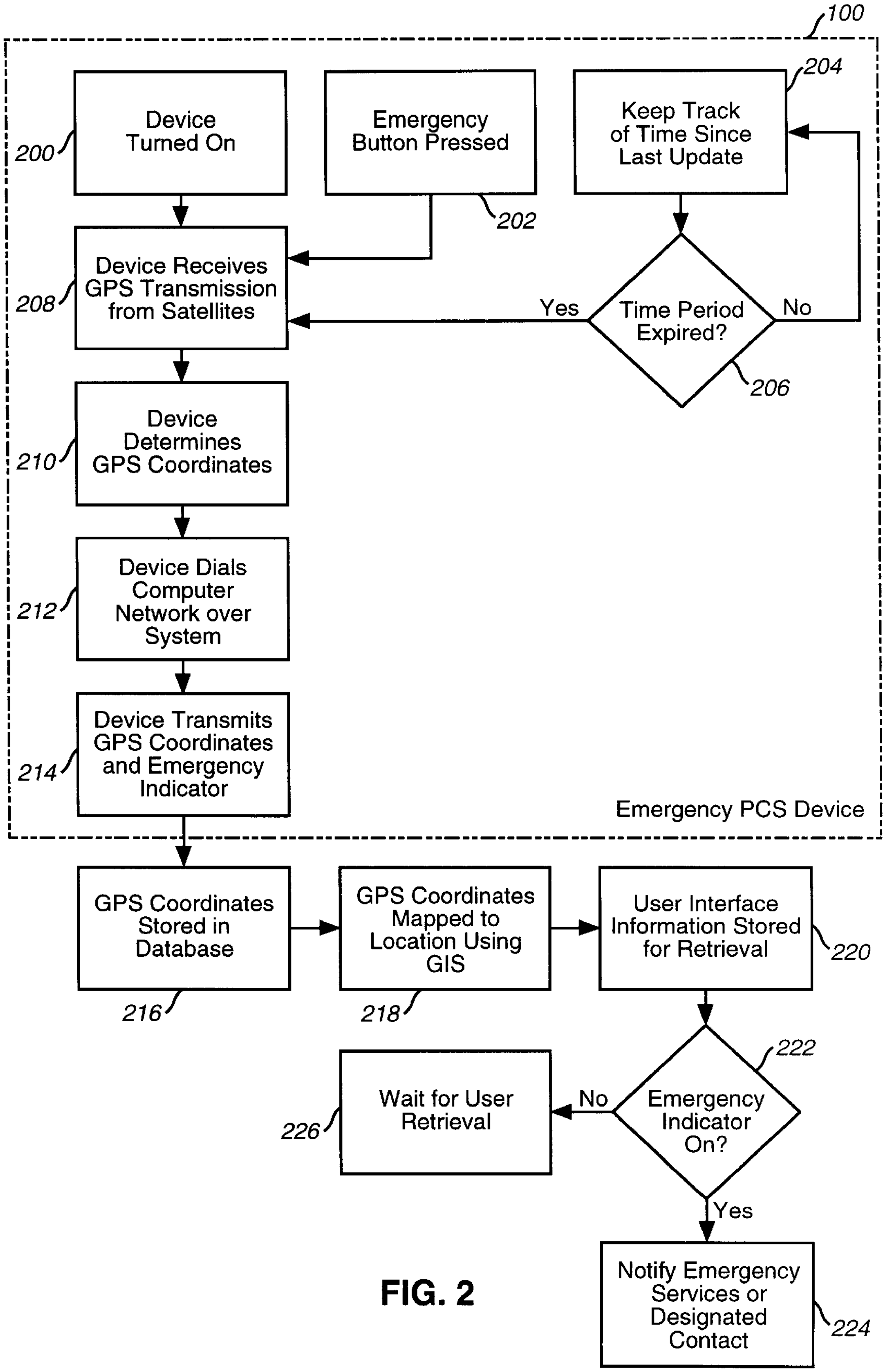
FIG. 2 shows a more detailed operating sequence of the emergency PCS device 100 for identifying and notifying the subscriber's location in accordance with one embodiment of the present invention.

FIG. 2 shows a more detailed operating sequence of the emergency PCS device 100 encompassed by the emergency PCS system in accordance with one embodiment of the present invention. In step 200, the emergency PCS device 100 is turned on. At this point, it initializes all circuit components and checks its internal memory. Upon detecting that the internal memory is empty, the emergency PCS device 100 determines that it must obtain coordinates from the GPS satellites immediately.

As stated earlier, the emergency PCS device 100 has an emergency distress button for automatic notification of its position. This facilitates an automatic and immediate notification of emergency services and/or a designated contact in case of an emergency. In step 202, the subscriber activates the distress signal by pressing the emergency distress button if the situation requires immediate help from others. Reception of signals from the GPS satellites follows step 202, as will be explained below.

Alternatively, step 204 shows the emergency PCS device 100 utilizing an internal clock to keep track of time for receiving signals from the GPS satellites. At the expiration of a predetermined, user-selected time period, the emergency PCS device 100 will request its coordinates from the GPS satellites. Thus, in step 206, a decision is made on whether the time period has expired. This decision is important because it prevents the emergency PCS device 100 from constantly determining its coordinates and expending PCS resources in updating the database. If the time period has expired, the emergency PCS device 100 will update its coordinates using the GPS satellite signals. Otherwise, the process is returned to step 204 in order to wait for the expiration of the time period.

Upon either the expiration of the time period or activation of the emergency distress button, the emergency PCS device 100 receives signals from the GPS satellites in "line of sight," in step 208. The information transmitted by the GPS satellites is used by a receiver in the emergency PCS device 100 for calculating its coordinates in terms of latitude and longitude, as shown in step 210.

Once the emergency PCS device 100 has determined its coordinates using GPS, it accesses a PCS system in step 212. Through this access, the emergency PCS device 100 can interface with a computer network to store the device's distinct coordinates. An identification number of the emergency PCS device 100 is transmitted along with its coordinates, as well as the emergency signal if applicable, as shown in step 214.

After completing the above steps, processing of the information continues outside the emergency PCS device 100. Thus, in step 216, the computer network stores the received information in a database. Next in step 218, the coordinates obtained from the GPS satellites and stored in the database are accessed by a computer application. This application may be a Geographical Information System (GIS) which converts the latitude/longitude coordinates into a block-street-city-country nomenclature, based on the precision available from the GPS transmission signals.

Once the coordinates from the GPS satellites have been mapped to common, widely understood location information, the location information is stored in the same or a different database for user interaction, as shown in step 220. The database now contains two sets representing the location information in different formats.

If the emergency distress button has been pressed as determined in step 222, an action is taken to automatically notify emergency services and/or a designated contact in step 224. By automatically dialing the telephone number of the emergency services which may include police, fire, medical ambulance, etc., and/or the designated contact, such as a relative or friend of the subscriber, help may be dispatched to the subscriber immediately. In the event that the emergency distress signal has not been activated from the emergency PCS device 100, its location information must wait for an on-demand inquiry in step 226. This inquiry may be a mother who has given the emergency PCS device 100 to her daughter going to a playground, for example. The inquirer can access the location information stored in the database via a voice response system or a computer link to the database.

FIG. 3 shows a representative data table containing temporal sequence of events before and after activation of the emergency PCS device 100. As shown in column 300, prior to its activation the emergency PCS device 100 keeps only the current time and its assigned identification number designated as WEPD (wireless emergency PCS device) ID in a non-volatile memory. The GPS coordinates, i.e., coordinates obtained from the GPS satellites, GIS map location, stored location, and emergency indicator are not available if the device is not turned on.

As indicated in column 302, after activation the emergency PCS device 100 initializes itself and immediately obtains its location using GPS. Once the coordinates are determined, they are sent via the PCS network to a centralized database. The database is accessed by the GIS application to convert the latitude and longitude coordinates into a common location identification, such as 111 Elm Street, New Orleans, La., USA. Although it may be activated, the emergency distress button is not pressed at this time which would not enable the emergency indicator.

Column 304 illustrates a periodic update based on the subscriber's movement. The centralized database may be updated every five minutes, for example, depending on the subscriber's requirements. In the illustrative example, the periodic update shows that after five minutes from the previous update, the subscriber is now located at 130 Elm Street, New Orleans, La., USA, which is a few blocks from the previous location.

Column 306 shows the subscriber's location in the emergency situation. The subscriber, now located at 220 Oak Street, faces an emergency situation requiring an immediate help. When the emergency distress signal is activated on the emergency PCS device 100 by pressing a button, all periodic updating is stopped. The emergency PCS device 100 immediately initiates a sequence of steps, as described above, to identify its position and cause the computer network to request help from emergency services and/or a designated contact.

Since those skilled in the art can modify the disclosed specific embodiment without departing from the spirit of the invention, it is, therefore, intended that the claims be interpreted to cover such modifications and equivalents.

What is claimed is:

1. An emergency personal communications services (PCS) system for providing information on the location of a user, comprising:

a PCS device, carried by said user, for receiving signal transmissions from a multiple of GPS satellites, converting said signal transmissions into information identifying a location of said PCS device, and automatically transmitting, over a unidirectional link, said location information and a unique code which identifies said PCS device to a computer network over a wireless medium, said PCS device including means for selectively generating a distress signal responsive to activation by said subscriber;

a database located on said computer network for storing said location information and said code;

responsive to storage in said database, an application program running on said computer network for converting said location information into generally understood location information which is stored;

responsive to said conversion and storage, means for automatically notifying emergency services with the generally understood location information if said distress signal has been generated; and a voice processing system to enable a telephone caller to access said database via said computer network in a non-emergency mode to obtain the generally understood location information of where said PCS device is located provided said caller is able to supply an identifier that corresponds to said unique code of said PCS device.

2. The system to claim 1, wherein said voice processing system comprises a voice response unit (VRU) which includes a menu selection for obtaining said on-demand information on said subscriber's location.

3. The system according to claim 1, further comprising a second database for storing said converted location information.

4. The system according to claim 1, wherein the PCS device includes an internal clock and further wherein said reception of said signal transmission from said multiple of GPS satellites and said transmission of said location information to said computer network occur periodically on a pre-determined basis as determined by the clock, update intervals being preselected by a PCS device user.

5. The system according to claim 1, wherein said reception of said signal transmissions from said multiple of GPS satellites and said transmission of said location information to said computer network occur immediately upon activation of said distress signal.

6. The system according to claim 1, wherein said automatic notification means notifies a designated contact if said distress signal has been generated.

7. The system according to claim 1, wherein said selective generation means comprise an emergency distress button which is activated by said subscriber.

8. A method of providing information on a user's location using an emergency personal communications services (PCS) system, comprising:

receiving signal transmissions from a multiple of GPS satellites;

converting said signal transmissions into information identifying a location of a PCS device;

automatically transmitting, over a unidirectional link, said location information and a unique code which identifies said PCS device to a computer network over a wireless medium;

storing said location information and said code in a database located on said computer network;

converting said location information into generally understood location information using an application program running on said computer network;

storing said converted location information;

automatically notifying emergency services with the generally understood location information if a distress signal has been generated responsive to activation by said subscriber; and enabling a telephone caller to interact with a voice processing system to access said database via said computer network in a non-emergency mode in order to obtain the generally understood location information of where said PCS device is located, provided said caller is able to supply an identifier that corresponds to said unique code of said PCS device.

9. The method according to claim 8, further comprising storing said converted location information in a second database.

10. The method according to claim 8, wherein the PCS device internally counts timing intervals, and further wherein said first three steps of receiving, converting and transmitting occur periodically on a pre-determined basis as determined by the clock, update intervals being preselected by a PCS device user.

11. The method according to claim 8, wherein said first three steps of receiving, converting and transmitting occur immediately upon activation of said distress signal.

12. The method according to claim 8, further comprising activating an emergency distress button by said subscriber to transmit said distress signal from said PCS device.

13. The method according to claim 8, further comprising automatically notifying a designated contact if said distress signal has been generated.

14. The system according to claim 3, further comprising a computer connected with said second database via said computer network for obtaining said on-demand information on said subscriber's location in response to an inquiry by a computer user.

15. The method of claim 9, further comprising establishing a computer link for connection with said second database via said computer network to obtain said on-demand information on said subscriber's location in response to an inquiry by a computer user.

* * * * *